Nov. 19, 1963 W. H. PRENTICE 3,111,440
DEVICES AND METHODS FOR APPLYING STRANDS
Filed June 16, 1960 3 Sheets-Sheet 1

INVENTOR.
WILLIAM H. PRENTICE
BY
ATTORNEYS

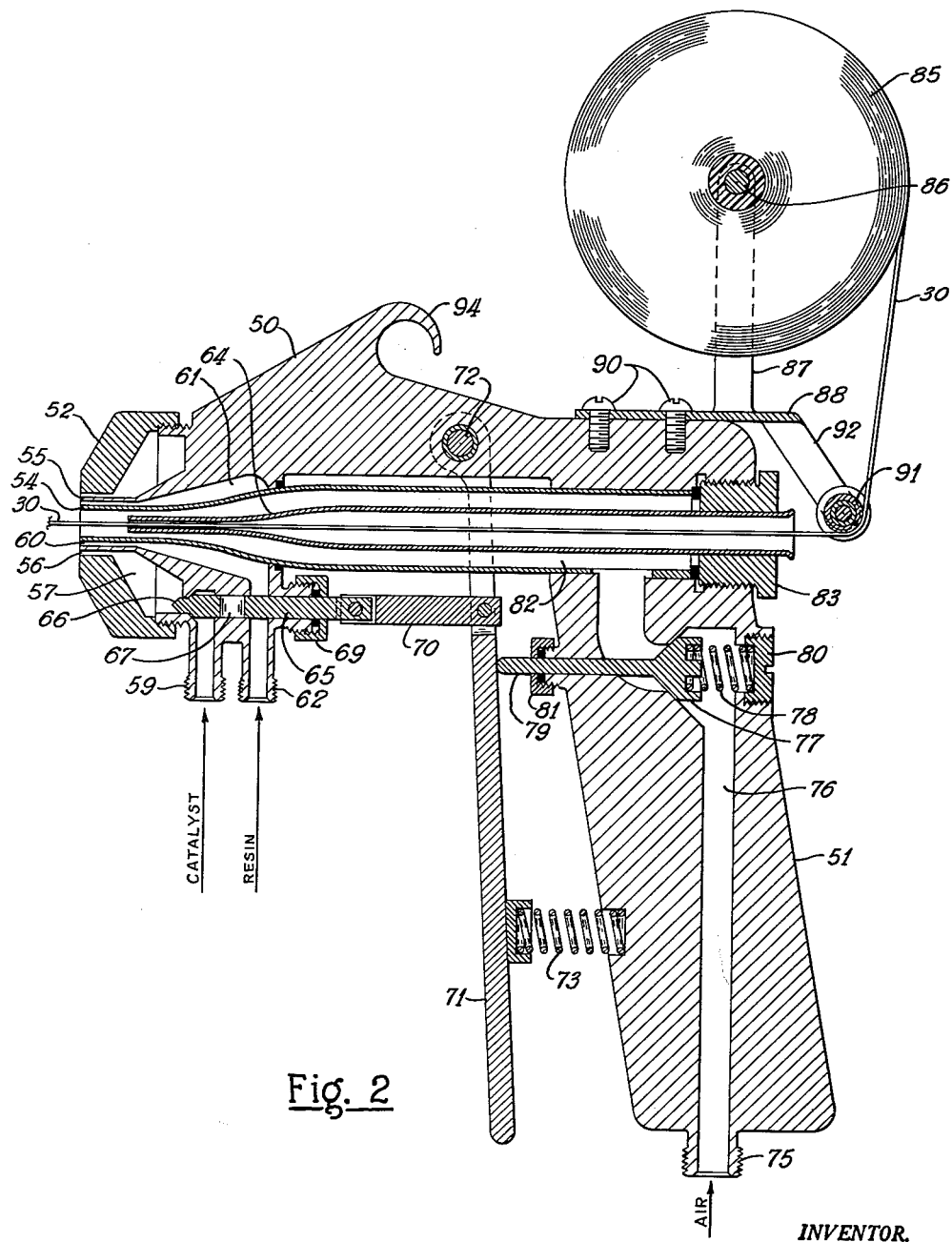

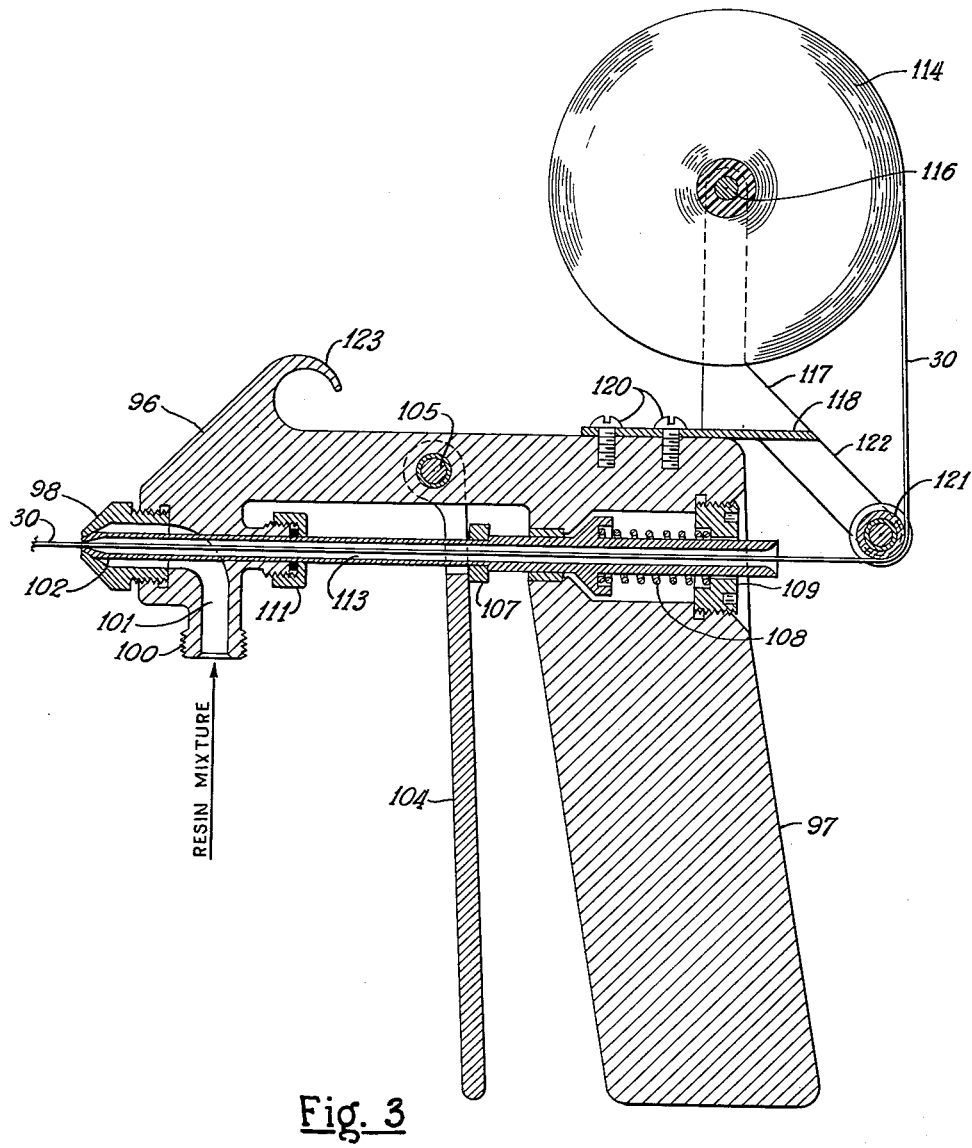

United States Patent Office 3,111,440
Patented Nov. 19, 1963

3,111,440
DEVICES AND METHODS FOR APPLYING STRANDS
William H. Prentice, Newark, Ohio, assignor to Owens-Corning Fiberglas Corporation, a corporation of Delaware
Filed June 16, 1960, Ser. No. 36,524
6 Claims. (Cl. 156—71)

This invention relates to the application or deposit of continuous strands of fibrous material and relates further to depositing simultaneously a continuous strand and a fluid material, with the fluid material preferably in atomized condition, and in surrounding relation to the strand.

More particularly the invention pertains to a method of applying a fluid material and a strand, in which the aspirating effect of atomizing air, or the dispensing movement of the fluid material is utilized to deliver the continuous strand.

Continuous fibrous strands are utilized as a reinforcing medium in plastic bodies and in various coating materials, which may be plastic asphaltic composition such as the coatings for roofs, or of other resinous constituents.

For the purpose of simplifying the presentation of the invention the term "strands" will be employed herein as a generic term to encompass various fibrous bodies such as rovings, slivers, cords, threads and yarns, whether formed of continuous or staple filaments.

Also, as the invention is of special value with the use of glass strands, the practice of the invention will be described in connection with such fibrous strands. It should be understood, however, that it is equally adapted to the deposit of most other fibrous strands of vegetable and synthetic origin, such as cotton, hemp, flax, nylon (polyamide), Orlon (acrylic) and Dacron (polyester).

In building boat hulls, alternate layers of plastic and fibrous glass are employed. In the molding of plastics, fibrous glass is included as a reinforcing agent. For these purposes, the glass material is ordinarily in short lengths, but is also utilized to some extent in continuous strand form for providing extra strength. For roofing products various fibers are customarily combined in the manufacturing process with the other constituents.

Where glass strands have been applied to a surface coating or introduced into the cavity of a mold, the fluid materials are separately deposited, before or after the laying on of the glass strands. This is also the procedure in the construction of glass fiber and plastic boats.

The principal object of this invention is to expedite the incorporation of a continuous strand in a fluid medium by providing devices and methods for applying the strand and the fluid material simultaneously and with the strand surrounded by the associated fluid material.

Another object of the invention is to provide a manually supported and operated device for projecting a continuous strand of material.

A further object is the provision of a device for discharging a continuous strand and atomized fluid material in surrounding relation therewith.

An additional object of the invention is to provide devices and methods for applying a surface coating incorporating reinforcing material in strand form.

A more specific object is a method of depositing a composite asphalt and fibrous glass coating as a roofing element.

A still further object is a device and method for simultaneously depositing in a mold continuous strands and a plastic molding material.

A supplemental object is the provision of a device and method for depositing a continuous strand and two fluid components, the two components reacting with each other to initiate a curing action.

These and other objects of the invention are attained in part through a hand portable device designed to carry a bobbin loaded with the strand to be deposited, and arranged to not only draw the strand from the bobbin but also to project the strand by movement of air or other fluid material brought into contact therewith.

The accomplishment of the objects of the invention is also secured through having nozzle means for projecting fluid material in surrounding relation with the strand.

A more detailed description of devices and methods for practicing the invention will be given hereafter in connection with the accompanying drawings in which:

FIGURE 2 is a vertical, longitudinal sectional view of a spray gun embodying a modified form of the invention; and FIGURE 3 is a view of a dispenser in vertical and longitudinal section, for discharging a strand and unatomized fluid material, in accordance with my invention.

Figures 1, 1A:
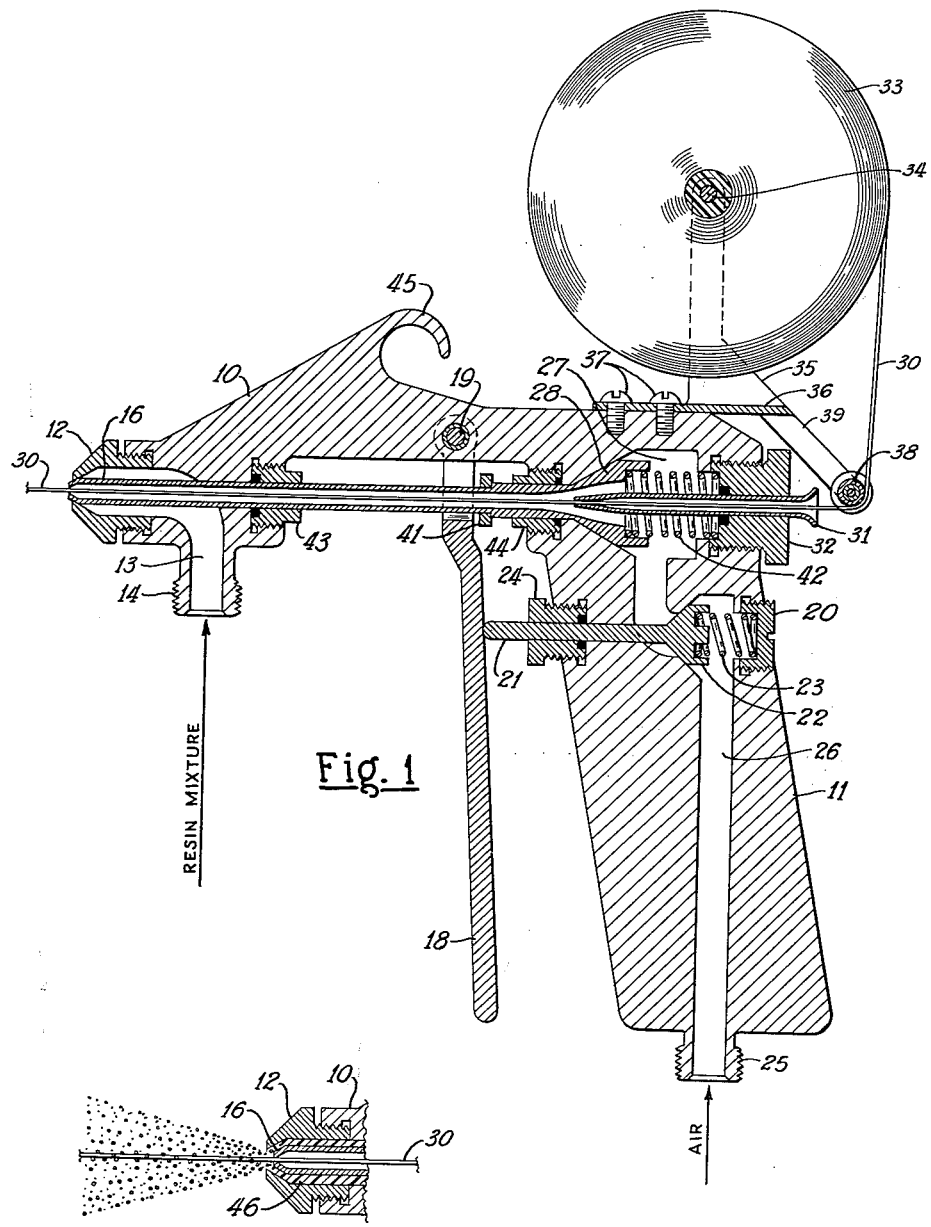
FIGURE 1 is a vertical, longitudinal section of a spray gun embodying one form of the invention.
FIGURE 1a is a like section of the nozzle only of the spray gun of FIGURE 1 with the material valve in open position.

Referring to the drawings in more detail, the spray gun shown in FIGURE 1 has a main body portion 10 with a depending handle 11. On the forward end of the device is a discharge nozzle 12 threaded into the body 10. The material to be sprayed may be delivered to the inlet connection 14 from a container directly attached to the inlet or through a connecting hose.

The coating material may be supplied under pressure or be drawn from a supply container through the aspirating effect of the air flowing from the discharge nozzle 12. The discharge of the material from the passage 13 and from the nozzle 12 is controlled by the hollow valve 16 which also serves as part of the atomizing air passage.

Operation of the spray gun is effected by manual retraction of the trigger 18. The trigger has a pair of upper legs by which it is pivotably suspended from the bearing pin 19 disposed in a transverse bore in the body. The trigger in its rearward movement first contacts the stem 21 of the air valve 22. This moves the air valve from its normally closed position in which it is held by the spring 23. Any air leak past the valve stem 21 is prevented by packing held therearound by the packing nut 24.

On opening of the valve 22, the compressed air, which may be in a volume of ten cubic feet per minute and under a pressure of sixty pounds, flows from the inlet connection 25 through the vertical passage 26 and past the valve to the chamber 27. The air then proceeds forwardly into the flared inner end 28 of the hollow material valve 16 and proceeds through the valve to issue into the atmosphere from the forward end thereof. This air movement entrains the strand or yarn of fibrous glass 30, which, for example, may be a single end of a weight providing 15,000 yards per pound.

The strand 30 is drawn by the action of the air through a guiding tube 31 mounted in the plug 32 which closes the rearward end of the chamber 27. The strand supply roll or bobbin 33 is mounted for rotation on a rod 34 supported between vertical arms 35 of the bracket 36. The latter is secured by machine screws 37 to the body 10. Strand 30, from the supply roll 33, is led around roller 38 mounted on the lower end of leg 39 of the bracket 36.

After the initial opening of the air valve 22 by the trigger 18, the trigger abuts the annular shoulder 41 of the material valve 16 and therethrough moves the material valve rearwardly to permit the outward discharge of material from the nozzle 12. Nuts 43 and 44 hold packings around the material valve 16.

The air under pressure emitted from the nozzle, following its travel through the center bore of the material valve, not only carries the strand 30, but also atomizes the coating material. The latter is discharged from the nozzle 12 in annular form around the stream of air, which is emitted from the end of the material valve 16, as may be seen in FIGURE 1a.

The dispensing rate of the fibrous glass strand depends upon various factors including the pressure and volume of the air, as well as the amount of coating material with which it is combined. A rate of seven hundred yards per minute is considered ample for average purposes, but may be increased or reduced as required.

Should it be desired to place extra strand in the deposited coating, the trigger may be pulled back only enough to open the air valve, without opening the material valve. The strand alone is thus discharged.

While an air operated cutter could be mounted on the spray gun for severing the strand at the end of each spraying operation, the accompanying weight and mechanism is undesirable. Accordingly it is preferred to cut the strand when necessary with a pair of hand shears.

The spray gun of FIGURE 1 may be employed to deposit a strand reinforced coating of asphalt upon a roof or a similarly tough surfacing layer of asphalt or other resinous material upon walls or other areas where special protection is desired. A sturdy membrane of this type may be used, for instance, over comparatively soft insulating boards.

The spray gun of FIGURE 2 is generally similar to that of FIGURE 1 but differs therefrom in having inlet connections for two resinous components of the spray material to be combined and activated in the spraying action, and the air delivery tube is stationary and does not serve as the spray material discharge valve.

This spray gun has a main body member 50 with a handle 51 depending from one end, and with the nozzle mounted on the other end thereof. Air for projecting the strand 30 and for atomizing the spray material is emitted from the outlet of the air tube 54. The first of the resin components of the spray material is discharged from between the cylindrical tip 55 and the air tube 54. The second component is emitted from the annular passage 56 constituting an extension of the chamber 57 located between the cylindrical tip 55 and the nozzle 52.

The second component which may constitute or contain a catalyst, as indicated in FIGURE 2, is delivered to the chamber 57 from the inlet connection 59. The first component is discharged from chamber 61 to which it arrives from the inlet connection 62. When mixed by the spraying action the catalyst in one component may be released by the effect of an accelerator in the other component to start the cure hardening of the deposited coating.

The combination valve 65 for both components of the material directly blocks inlet connection 62 and has a forward tapered end 66 for closing the communicating port between the inlet connection 59 and the chamber 57. The valve 65 is joined through link 70 to the trigger 71. On rearward movement of the trigger, pivoting on its pin support 72, spring 73 is compressed and the tapered end 66 of the valve is drawn rearwardly to free the port between inlet connection 59 and chamber 57; and the cross bore 67 in the valve is brought in line to open the inlet connection 62 to chamber 61.

Located axially of the air tube 54 is the strand guiding and discharge member 64. Air for atomizing the coating material and aspirating the strand 30 is admitted to the spray gun through inlet 75 at the base of the handle 51. The air travels therefrom up passage 76. This air movement is under the control of the air valve 77, which is normally held in closed position by spring 78, but is opened in opposition thereto through action of the trigger against the valve stem 79. The valve chamber is rearwardly sealed and the spring 78 is supported by the threaded closure 80.

The strand 30 is fed to the guiding and delivering member 64 from the bobbin 85 which is mounted on the rod 86. The latter is supported upon the arms 87 of the bracket 88 secured to the spray gun body 50 by machine screws 90. The strand from the bobbin is led around the roller 91 carried on the depending leg 92 of the bracket 88.

A hanger hook 94 for supporting the applicator when it is not in operation projects upwardly from the body 50.

The spray gun of FIGURE 2 is of special value for distributing in a normally thermal setting resinous or plastic substance, a catalytic, promoting, or reactive agent which induces or causes polymerization with a lesser amount of applied heat, or even without the addition of any heat beyond that provided by the surrounding atmosphere or arising from exothermic reaction of the applied coating.

These additive substances may be of various compositions and functions. For instance a peroxide catalyst may be the element thus added to a polyester resin. With epoxy resins, amines may be the additive finally introduced in the spray application as a curing agent. The additive agent could be one of several coagulants for use in setting up a rubber latex coating material.

In FIGURE 3 is shown an applicator for depositing material in unatomized form with a strand embedded therein. No compressed air is utilized in this embodiment of the invention.

The device has a main body member 96 with a depending handle 97 and a nozzle 98 at its forward end. The material to be applied is delivered under pressure to the inlet connection 100 and moves through passage 101 to be discharged under the control of valve 102. The latter is opened by rearward movement of the trigger 104 against the shoulder 107 of the valve. The trigger is mounted on the pin 105 journalled in the body 96. Opening movement of the valve is opposed by spring 108, supported upon the plug 109. The valve movement through the forward end of the body is sealed by the packing nut 111.

The needle has a center bore 113 for receipt of a strand 30 from the supply roll 114. This roll or bobbin is mounted on a rod 116 supported by a pair of arms 117 of the bracket 118. This bracket is held to the applicator body by machine screws 120.

The strand 30 from the supply roll 114 is guided to the center bore 113 of valve 102 by the roller 121 mounted on the leg 122 extending downwardly from the bracket 118. A conventional hanger hook 123 is for supporting the applicator when not in operation.

The dispenser of FIGURE 3 may be utilized for caulking operations while incorporating oakum or other fibers in the plastic filling compound. The device also may be employed for filling molds or other cavities with a settable plastic with continuous rovings or yarns of fibrous glass embedded therein. For this purpose the glass strands are preferably coated with a binder compatible with the particular resin involved. This assures maximum wetting and bonding between the fibers and the resin.

By far the largest and most widely used family of resins for reinforced molded plastics are polyesters. These have excellent processing characteristics, good balance of physical and mechanical properties, and the ability to be cured at room temperature if necessary. Epoxies have excellent mechanical strength and electrical properties but their use is limited by factors of cost and critical curing requirements. Among other resins utilized are silicone and phenolic.

A principal feature of the invention resides in the means and methods heretofore described for projecting a continuous strand axially of a stream of fluid material. This simultaneous application is not only economical due to the time saved but is most advantageous for incorporating a strand in quick-setting coating and molding compounds. The procedure also assures thorough embedding and dispersion of the strand.

With alternate embodiments of the invention, the fluid material may be deposited as a spray or in unatomized condition; and for increasing the amount of strand the latter may momentarily be dispensed alone. While the invention has been described for manual operations, certain forms of it are also suitable for stationary installations under automatic control.

A single spool has been illustrated for feeding a single fibrous strand. Under some circumstances it may be desired to apply two or more strands at one time. These may then be wound on the same bobbin, or two or more bobbins may be mounted in tandem with the strand from each guided to the spray gun or dispensing device. An arrangement involving multiple bobbins could have them placed axially in line with the strands led through the center bores of the bobbins.

Other modifications and substitutions, within the province of the invention and the scope of the appended claims will occur to those skilled in this or related arts.

I claim:

1. A hand portable device for applying a continuous, multi-filament strand, including a body, a handle depending from the body, a spool-type carrier for a supply of strand mounted on the body, a fluid discharge nozzle on the body, means for delivering a fluid under pressure to the nozzle and discharging it therefrom, a guide member loosely leading a strand from the carrier to the interior of the nozzle and into contact with fluid discharged therefrom, the fluid being discharged from the nozzle with sufficient force to entrain and draw the strand from the carrier, through the guide member and out the nozzle with the fluid, and a manually operated valve in the body for controlling the discharge of the fluid and the entrained strand.

2. A hand supported spray gun for simultaneously applying a coating material in atomized form and a continuous, multi-filament strand, including a body, a spool-type holder on the body for a supply of strand, a discharge nozzle, a tubular guide member for loosely receiving a strand from the holder, said member being positioned in line with the axis of the nozzle, means for directing compressed air into aspirating relation with the strand within the guide member and entraining the strand to carry it to and through the nozzle, a passage to the nozzle for coating material, and means delivering coating material under pressure through the passage and into association with the compressed air for atomizing thereby and for being discharged from the nozzle with the air and the strand entrained therein.

3. A spray gun according to claim 2 adapted to apply a coating material having two components, said spray gun having a second passage to the nozzle for the second component of the coating material, and means for discharging the two components in coaxial paths for mixing and atomizing by the compressed air.

4. A spray gun for simultaneously applying a coating material in atomized form and a continuous, multi-filament strand, including a body, a discharge nozzle on the body, an inlet connection and a passage therefrom to the nozzle for coating material, an atomizing air inlet connection and an air passage therefrom to the nozzle, manually actuated valves respectively controlling the flow of coating material and atomizing air from the nozzle, said valve for the coating material being positioned axially of the nozzle and having a bore therethrough, said bore constituting a part of said air passage, a spool mounted on the spray gun for carrying a supply of a continuous strand, and means for delivering a continuous strand from the spool to said bore, whereby the air traveling therethrough entrains the strand and carries it out the nozzle and centrally of coating material discharged from the nozzle.

5. A hand portable dispenser for depositing a fluid material, including a discharge nozzle, means for delivering a fluid material under pressure to the nozzle, a manually retractable, hollow needle valve controlling the discharge from the nozzle of the material, a spool mounted on the dispenser for carrying a supply of a continuous strand, and means for guiding a continuous strand from the spool and through the hollow needle valve to the nozzle, whereby the continuous strand is drawn out of the nozzle by the discharge of the material and is deposited therewith.

6. The method of depositing a fluid coating material and a continuous fibrous strand embedded therein upon a receiving surface which comprises forcefully projecting a stream of fluid coating material toward the surface from a projection source spaced from the surface, centrally entraining a continuous fibrous strand in the stream of fluid coating material at the projection source, propelling the strand with the fluid coating material, and depositing the strand in merged relation with said coating material upon the surface.

References Cited in the file of this patent
UNITED STATES PATENTS

| | | |
|---|---|---|
| 2,150,949 | Stevens | Mar. 21, 1939 |
| 2,207,765 | Stevens | July 16, 1940 |
| 2,411,660 | Manning | Nov. 26, 1946 |
| 2,693,844 | Bay | Nov. 9, 1954 |
| 2,781,154 | Meredith | Feb. 12, 1957 |
| 2,991,015 | Standlick | July 4, 1961 |
| 3,079,663 | Dyer et al. | Mar. 5, 1963 |

FOREIGN PATENTS

| | | |
|---|---|---|
| 163,640 | Australia | Jan. 28, 1954 |

OTHER REFERENCES

Modern Plastics—May 19, 1959, vol. 36, No. 9, pages 85–89, 210, 211 and 214.